Nov. 5, 1968  B. J. HAYNER  3,409,310

VEHICLE ANTI-SKID STABILIZING DEVICE

Filed May 5, 1967

INVENTOR
BUDDIE J. HAYNER

BY Ross W. Campbell

ATTORNEY

United States Patent Office 3,409,310
Patented Nov. 5, 1968

3,409,310
VEHICLE ANTI-SKID STABILIZING DEVICE
Buddie J. Hayner, Flushing, Mich., assignor to Flushing Research Corporation, Flushing, Mich., a corporation of Michigan
Filed May 5, 1967, Ser. No. 637,871
3 Claims. (Cl. 280—150)

ABSTRACT OF THE DISCLOSURE

An elongated weight having a longitudinal bore therethrough is slideably disposed within a hollow casing having a Teflon lining. End plates bearing bracket means for mounting the device to a vehicle close the ends of the casing and support a guide rod which extends through the casing and the bore of the sliding weight. The end plates also bear bracket means for mounting the device transversely of the longitudinal axis of a vehicle near the rear thereof. A pair of Teflon bearings are supported at each end of the weight and arranged to space and slideably support it within the Teflon lining of the casing. A pair of counterbores are provided in each end of the weight, a pair of annular Nylatron bushings are seated within the counterbores, respectively, surrounding the guide rod, and a pair of variable pitch compression springs are disposed between each end plate and the bushing within the counterbore in the near end of the weight, respectively. The variable pitch springs yieldingly urge the weight to return to a central position within the casing with a pressure increasingly proportional to the extent of transverse displacement of the weight from the center of the casing when the weight is displaced by skidding movement of the vehicle.

---

The present invention relates to anti-skid stabilizing devices and more particularly to a device for stabilizing automotive vehicles against skidding.

In a modified form of the invention the Teflon lining and bearings and the Nylatron bushings are omitted, and the weight is slidingly supported upon the guide rod by a pair of lineal bearings seated within rubber bushings within additional counterbores in each end of the weight. The lineal bearings and rubber bushings are retained by Nylatron bushings which bear a cylindrical post extending into the near end of the helical compression springs. In the first form of the invention the Teflon bearings permit the weight to slide within the Teflon bushing of the casing with a minimum of friction, and in the modified form the lineal bearings perform this function.

Conventional anti-skid devices utilizing spring-loaded moveable weights are limited in their effectiveness by internal friction of their moving element or elements. Such friction causes a delayed response to skidding movement of the vehicle and accordingly reduces the effectiveness of the device. The springs used to tension the moving weights in such conventional devices exert corrective pressures directly proportional to the extent of displacement of the weight or weights. In the case of very slight skids such tension and the accompanying corrective pressure upon the vehicle may be in excess of that required to correct the skid and, instead, cause over-correction and oscillation or "fishtailing." In the case of skids of extreme violence, the corrective pressure produced by conventional spring tension means may be insufficient to correct the skid unless the anti-skid device permits sufficiently great displacement of the weight to produce adequate compression of the spring and, consequently, sufficient tension and reaction to cope with the emergency. The time lag required for such great displacement and reaction causes a delay in corrective action by the device, and the greater the skidding motion the greater the delay. High internal friction, and weight displacement a distance directly proportional to the force of a skid are hence the two major factors limiting the effectiveness of conventional anti-skid devices.

It is accordingly an object of the present invention to provide in an anti-skid stabilizing device tension means arranged to exert corrective pressure increasingly proportional to the extent of displacement of a weight.

Another object of the invention is to provide an improved anti-skid stabilizing device with exceedingly low internal friction.

A further object is to provide an improved anti-skid stabilizing device which is inexpensive, simple in construction, and free of need for maintenance.

The above and other objects of the invention which will later become apparent as the following description proceeds, are attained by the present invention, a preferred embodiment of which has been illustrated, by way of example only, in the accompanying drawing, forming a part of this specification in which like characters are employed to designate like parts throughout the same, and wherein.

Figures 1, 2, 3, 4, 5, 6:
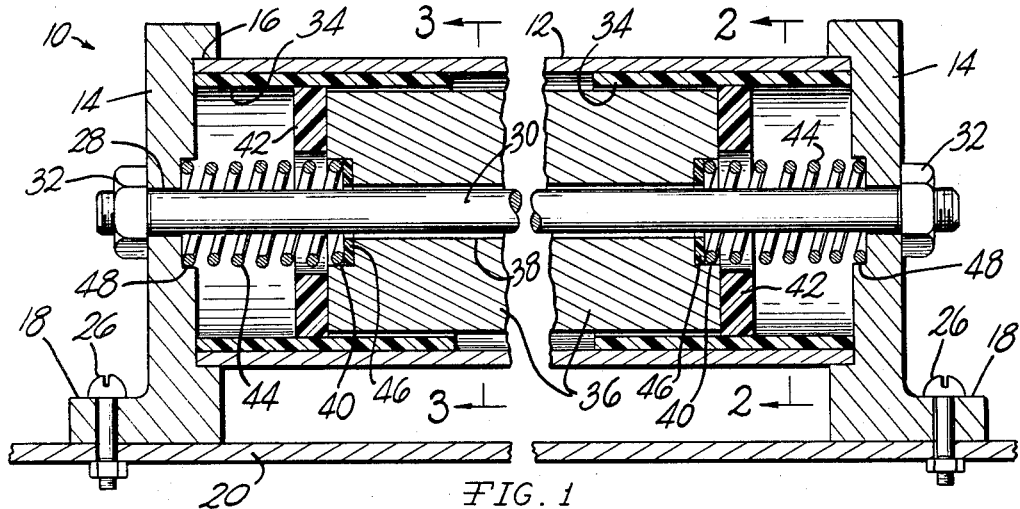
FIGURE 1 is a vertical longitudinal sectional view of the preferred embodiment of my invention.
FIGURE 2 is a transverse sectional view taken along line 2—2 of FIGURE 1.
FIGURE 3 is a transverse sectional view taken along line 3—3 of FIGURE 1.
FIGURE 4 is a vertical longitudinal sectional view of a modified form of my invention.
FIGURE 5 is a transverse sectional view taken along line 5—5 of FIGURE 4.
FIGURE 6 is a rear view of an automobile showing my invention operatively mounted thereon.

Referring now more particularly to the drawings, my improved anti-skid stabilizing device generally indicated at 10 includes an elongated, hollow, aluminum casing 12 preferably tubular in shape. I have found it convenient to form casing 12 with a length of approximately 23 inches and a diameter of approximately 4½ inches. A pair of aluminum end brackets 14, 14 are provided to close the ends of casing 12 and preferably have a circular recess 16 in the inner face thereof disposed to receive an end of the casing, and an outwardly extending foot 18 at the bottom thereof for mounting the device to the deck 20 of the luggage department 22 of a conventional motor vehicle 24 by means of nut and bolt combinations 26 or the like.

Brackets 14, 14 are provided with bores 28, 28 concentric with recesses 16, 16 to receive an elongated guide rod 30 of approximately ⅝ inch diameter which extends axially therethrough and through casing 12. The ends of guide rod 30 are threaded to receive a pair of nuts 32, 32 which securely retain casing 12, brackets 14, 14, and the guide rod as a rigid assembly, preventing entry into the casing of dust or other matter productive of friction, when the device is assembled.

A Teflon lining 34 is cemented to the inner surface of casing 12 and extends from each end of the casing to a depth within the casing beyond the limit of travel of each end of a weight 36, hereinafter described.

I provide a cylindrical weight 36 weighing approximately 55 pounds, having a length of approximately 19 inches, and a diameter slightly less than that of casing 12 and of lining 34. Weight 36 is provided with an axial bore 38 of greater diameter than guide rod 30, so as to surround the guide rod without touching it, and is further provided with a pair of counterbores 40, 40 at each end of the bore, respectively. A pair of annular Teflon bearings 42, 42 are cemented to the ends of weight, respectively, in concentric relationship therewith. Bearings 42, 42 surround but do not touch guide rod 30 and have a slightly greater diameter than weight 36 so as to space the weight uniformly from lining 34 and to form a freely sliding fit within the lining. Weight 36 is thus able to slide freely in a longitudinal direction within casing 12, surrounding but not touching guide rod 30, and totally supported by sliding contact of Teflon bearings 42, 42 within Teflon lining 34, 34. Because of the exceedingly low coefficient of friction between Teflon surfaces, internal friction of the device is thus reduced to a minimum.

I further provide a pair of variable pitch helical compression springs 44, 44 surrounding guide rod 30, with one end of each spring inserted within counterbore 40 and resting against an annular Nylatron washer 46 seated therein, and the other end retained within a shallow counterbore 48 in the inner face of the near bracket 14 concentric with bore 28. Springs 44, 44 are designed to exert a slight pressure upon weight 36 when the weight is in its centered position of rest, so as to yieldingly maintain it in such position within casing 12. When weight 36 is displaced longitudinally within casing 12 by skidding movement of vehicle 24, the spring 44 in the direction of displacement is compressed. When the skidding movement of the vehicle has ceased, spring 44 urges weight 36 to return to its centered position of rest within casing 12.

It should be particularly noted that the variable pitch of springs 44, 44 will cause each spring to respond delicately to even a slight longitudinal translation of weight 36, thereby providing a nearly instantaneous reaction and counter-pressure against the end plate 14 opposite to the direction of skid and exerting a corrective pressure to the slightest skidding movement of the vehicle. It should also be noted that the helical nature of springs 44, 44 causes the springs to exert a much greater corrective counter-pressure against the end plate 14 when weight 36 is translated a greater distance within casing 12, without the necessity of requiring the weight to travel an extensive distance within the casing and without the time delay and lag in corrective response of the device incident thereto. It will thus be seen that the variable pitch springs 44, 44 of my anti-skid stabilizing device cause a more rapid corrective response to both slight skidding movement and to extreme skidding movement of the vehicle with which it is used, without the necessity of a longer distance of travel of weight 36 and the delay in response which results therefrom. Further, because of the relatively short distance which weight 36 must return after an extensive skidding movement, tendency to oscillation or "fishtailing" is effectively reduced.

We thus see that the variable pitch of springs 44, 44 causes the device to produce a counter-force increasingly proportional to the skidding movement of the vehicle with which the device is utilized. Hence the corrective counter force supplied by the device is responsive and proportional to the force of the skidding movement of the vehicle with which it is used, without the delay in response which exist in conventional devices because of the necessity for extensive displacement of the weight in the case of extreme skids and without the stiffness and lack of delicacy of response to slight skidding movements which results from utilizing springs of uniform compressive strength. The efficiency and safety provided by the present invention will thus be apparent.

In the modified form of my invention shown in FIGURES 4 and 5, I provide a casing 12', end brackets 14', 14', a guide rod 30' and variable pitch compression springs 44', 44', as in the first embodiment of my invention. I omit, however, lining 34, bearings 42, 42, and washers 46, 46. I also provide a weight 36' with a bore 38' and counterbores 40', 40' therein.

To slideably support weight 36' without casing 12', I provide a pair of rubber bushings 52, 52 lining counterbores 40', 40', and a pair of lineal bearings 54, 54 seated securely within each bushing, respectively. Lineal bearings 54, 54 are selected to slidingly receive guide rod 30, which extends therethrough. Weight 36' is thus slideably supported entirely upon guide rod 30' by lineal bearings 54, 54, in spaced relationship from the cylindrical wall of casing 12'. To retain lineal bearings 54, 54 and bushings 52, 52 within counterbores 40', 40', a Nylatron bushing 56 is press-fitted into each counter-bore 40' and bears a cylindrical post or stud 58 which extends into the near end of spring 44'.

The length of the casings 12 and 12', and the length and weight of weights 36 and 36', hereinabove described, have been found to be most effective for use with vehicles weighing less than approximately 3900 pounds. For vehicles weighing more than 3900 pounds, I have found it desirable to form casings 12 and 12' with a length of approximately 29 inches, and to form weights 36 and 36' with a length of approximately 25 inches and a weight of approximately 75 pounds.

It is to be understood that the forms of the invention herewith shown and described are to be taken as preferred embodiments of the same and that resort may be had to various changes in construction without departing from the scope of the subjoined claims.

What is claimed is:

1. A vehicle anti-skid device comprising:
a hollow casing,
end plates closing the ends of said casing and adapted to support said assembly on a vehicle,
a weight disposed within said casing,
bearing means arranged to support said weight slideably within said casing,
and a pair of variable pitch compression springs disposed between each end plate and the near end of said weight, respectively, and adapted to yieldingly urge said weight to return to a central position within said casing with a pressure increasingly proportional to the extent of displacement of said weight from the center of said casing when said weight is translated within said casing in response to skidding movement of said vehicle.

2. A vehicle anti-skid device comprising:
a hollow casing,
a tetrafluorethylene lining borne by the interior of said casing,
end plates closing the ends of said casing and adapted to support said assembly on a vehicle,
a weight having an axial bore therein disposed within said casing,
a guide rod extending axially through said casing and bore and supported by said end plates,
a pair of tetrafluorethylene bearings supported near each end of said weight and arranged to slideably support said weight within said tetrofluor ethylene lining,
and a pair of variable pitch compression springs disposed between each end plate and the near end of said weight, respectively, and adapted to yieldingly urge said weight to return to a central position within said casing with a pressure increasingly proportional to the extent of displacement of said weight from the center of said casing when said weight is translated within said casing in response to skidding movement of said vehicle.

3. A vehicle anti-skid device comprising:
a hollow casing,
end plates closing the ends of said casing and adapted to support said assembly on a vehicle,
a weight having an axial bore therein disposed within said casing,
a guide rod extending axially through said casing and bore and supported by said end plates, a pair of lineal bearings slideably supporting said weight upon said guide rode, and a pair of variable pitch compression springs disposed between each end plate and the near end of said weight, respectively, and adapted to yieldingly urge said weight to return to a central position within said casing with a pressure increasingly proportional to the extent of displacement of said weight from the center of said casing when said weight is translated within said casing in response to skidding movement of said vehicle.

References Cited
UNITED STATES PATENTS 2,993,721   7/1961   Brown _____ 280—150

BENJAMIN HERSH, *Primary Examiner.*

R. SONG, *Assistant Examiner.*